(12) United States Patent
Regmi et al.

(10) Patent No.: US 9,352,990 B2
(45) Date of Patent: *May 31, 2016

(54) METHOD AND APPARATUS FOR MAXIMIZING NITROGEN REMOVAL FROM WASTEWATER

(71) Applicants: D.C. Water & Sewer Authority, Washington, DC (US); Hampton Roads Sanitation District, Virginia Beach, VA (US)

(72) Inventors: Pusker Regmi, Virgina Beach, VA (US); Mark Miller, Virginia Beach, VA (US); Sudhir N. Murthy, Herndon, VA (US); Charles B. Bott, Virginia Beach, VA (US)

(73) Assignees: D.C. Water & Sewer Authority, Washington, DC (US); Hampton Roads Sanitation District, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/210,816

(22) Filed: Mar. 14, 2014

(65) Prior Publication Data

US 2014/0263041 A1    Sep. 18, 2014

Related U.S. Application Data

(60) Provisional application No. 61/783,232, filed on Mar. 14, 2013.

(51) Int. Cl.
| | | |
|---|---|---|
| *C02F 3/00* | (2006.01) | |
| *C02F 3/30* | (2006.01) | |
| *C02F 1/24* | (2006.01) | |
| *C02F 3/08* | (2006.01) | |

(Continued)

(52) U.S. Cl.
CPC .............. *C02F 3/006* (2013.01); *C02F 3/301* (2013.01); *C02F 3/307* (2013.01); *C02F 1/24* (2013.01);

(Continued)

(58) Field of Classification Search
CPC ........ C02F 3/303; C02F 1/72; C02F 2209/15; C02F 3/305; C02F 3/307; C02F 2209/14; C02F 2209/22; C02F 2209/006; C02F 2209/005; C02F 3/301; C02F 3/302; C02F 3/006; C02F 1/727; C02F 1/74; C02F 2101/10; C02F 2101/16; C02F 2101/163; C02F 2101/166; C02F 2101/38; C02F 2209/16; C02F 2303/18; C02F 2209/00; C02F 2209/001; C02F 2209/003; C02F 2209/008; C02F 2209/225; C02F 2209/38; Y02W 10/15

See application file for complete search history.

(56) References Cited

U.S. PATENT DOCUMENTS

| | | |
|---|---|---|
| 5,525,231 A | 6/1996 | Ho et al. |
| 5,626,755 A | 5/1997 | Keyser et al. |

(Continued)

FOREIGN PATENT DOCUMENTS

CN        201025823 Y  *  2/2008  ............. A01K 61/00

OTHER PUBLICATIONS

Translation of CN 201025823 Y, Zhenfeng et al., downloaded from Espacenet(EPO), accessed on Nov. 1, 2014.*

*Primary Examiner* — Lucas Stelling
*Assistant Examiner* — Rohit K Dewan
(74) *Attorney, Agent, or Firm* — Blank Rome LLP

(57) ABSTRACT

A reactor and control method for maximizing nitrogen removal and minimizing aeration requirements through control of transient anoxia and aerobic SRT, repression of NOB, and control of dynamic DO concentrations or aeration interval by keeping the reactor $NH_4$ and $NO_x$ concentrations approximately equal. Controls are provided for maximizing the potential for TIN removal through nitrification, limited nitritation, nitritation, denitrification, limited denitritation, denitritation making use of 1) real time measurement of ammonia, nitrite, nitrate, 2) operational DO and the proper use of DO setpoints, and 3) proper implementation of transient anoxia within a wide range of reactor configurations and operating conditions.

24 Claims, 11 Drawing Sheets

(51) Int. Cl.
*C02F 3/10* (2006.01)
*C02F 3/12* (2006.01)

(52) U.S. Cl.
CPC . *C02F 3/08* (2013.01); *C02F 3/104* (2013.01); *C02F 3/1257* (2013.01); *C02F 3/1263* (2013.01); *C02F 3/1268* (2013.01); *C02F 2209/001* (2013.01); *C02F 2209/005* (2013.01); *C02F 2209/006* (2013.01); *C02F 2209/10* (2013.01); *C02F 2209/14* (2013.01); *C02F 2209/15* (2013.01); *C02F 2209/44* (2013.01); *Y02W 10/15* (2015.05)

(56) References Cited

U.S. PATENT DOCUMENTS

| | | | |
|---|---|---|---|
| 6,616,843 B1 * | 9/2003 | Behmann et al. | 210/605 |
| 7,153,429 B1 | 12/2006 | Pedros | |
| 8,252,182 B1 | 8/2012 | Chang et al. | |
| 8,323,498 B2 | 12/2012 | Jenkins et al. | |
| 2009/0211957 A1 * | 8/2009 | Cormier et al. | 210/139 |
| 2013/0213883 A1 * | 8/2013 | Josse | C02F 3/302 210/630 |

* cited by examiner

| Average (8/26/2012-9/4/2012) | | | |
|---|---|---|---|
| Influent NH3-N, mg/L | Influent sCOD, mg/L | Nitritation Eff TIN, mg/L | Nitritation % TIN Removal |
| 32.1 | 145 | 5.3 | 84 |

METHOD AND APPARATUS FOR MAXIMIZING NITROGEN REMOVAL FROM WASTEWATER

This nonprovisional application claims the benefit of U.S. Provisional Application No. 61/783,232, filed Mar. 14, 2013. The entire disclosure of U.S. Provisional Application No. 61/783,232 is incorporated herein by reference.

Simultaneous nitrification and denitrification (SND) in a single tank is highly desirable compared to the conventional systems, since separate tanks and recycling of mixed liquor nitrate from the aerobic nitrifying zone to the anoxic denitrifying zone is not required. The benefits of SND are further extended by exploiting the nitrite shunt pathway as has been demonstrated by the use of aeration duration control with ORP (see Guo et al. 2009, the disclosure of which is expressly incorporated by reference herein in its entirety) and ammonia pH profile (see Peng et al. 2004, the disclosure of which is expressly incorporated by reference herein in its entirety). The reactor microenvironments (aerobic and anoxic zones developing within reactor due to combination of poor mixing and reactor design) and the floc microenvironments (aerobic and anoxic zones developing within the activated sludge flocs) have been postulated as possible mechanisms for SND (see Daigger et al. 2007, the disclosure of which is expressly incorporated by reference herein in its entirety). It is difficult to incorporate control strategies in the above-mentioned mechanisms to achieve stable SND performance. The occurrence of SND are reported in staged, closed loop reactors (such as oxidation ditch, orbal) (see Daigger and Littenton, 2000, the disclosure of which is expressly incorporated by reference herein in its entirety) that typically employ long hydraulic residence time (HRT), solids retention time (SRT), and continuous low dissolved oxygen (DO).

The inhibition of nitrite oxidizing bacteria (NOB) is a precondition for the implementation of short-cut biological nitrogen removal (ScBNR) processes such as nitritation-denitritation (see Ciudad et al., 2005; Gee and Kim, 2004, Ju et al., 2007, Yoo et al., 1999, Yu et al., 2000, Zeng et al., 2008, the disclosures of which are expressly incorporated by reference herein in their entirety), nitrite-shunt and partial nitritation-anammox (see Fux et al., 2002, Hippen et al., 1997, van Dongen et al., 2001, Wett, 2006, Wett, 2007, Wett et al., 2010, the disclosures of which are expressly incorporated by reference herein in their entirety), and deammonification. Successful suppression of nitrite oxidation by controlling NOB saves 25% oxygen and 40% organic carbon compared to conventional nitrification-denitrification (see Turk and Mavinic, 1986; Abeling and Seyfried, 1992, the disclosures of which are expressly incorporated by reference herein in their entirety). In deammonification processes, the control of NOB results in added benefits in further reductions in aeration energy required, and reduced costs of electron donor and solids handling. FIG. 1, FIG. 2 and FIG. 3 show flowcharts for nitrogen removal through conventional nitrification/denitrification, nitritation/denitritation and deammonification (partial nitritation+anaerobic ammonia oxidation), respectively.

In view of high cost of biological nutrient removal (BNR) to meet increasingly stringent effluent standards, ScBNR through repression of NOB is a topic of interest. Efforts to understand NOB repression have been discussed in many publications, including those that are more specific to the use of high temperature (see Helling a et al., 1998, the disclosure of which is expressly incorporated by reference herein in its entirety), high levels of free ammonia inhibition, or dissolved oxygen (DO) concentration (see Blackburn et al., 2008, the disclosure of which is expressly incorporated by reference herein in its entirety) and transient anoxia (see Komaros and Dokianakis, 2010, the disclosure of which is expressly incorporated by reference herein in its entirety). Particularly, all of these conditions are used in part or as a whole, in various approaches, with success in controlling NOB in systems treating 'high strength' (high free ammonia) waste streams, such as anaerobic digester dewatering liquor (also usually at high temperature) and landfill leachate. Control of NOB repression in low strength waste streams such as domestic wastewater remains a challenge and is the subject of this disclosure. Controls that are currently used to repress NOB in ScBNR processes are described below.

Temperature and Ammonia:

Both temperature and free ammonia are features believed to provide an advantage to ammonia oxidizing bacteria (AOB) over NOB. Free ammonia (FA) inhibition of NOB has been well-documented in literature ever since it was considered by Anthonisen et al. (1976), the disclosure of which is expressly incorporated by reference herein in its entirety. However, knowledge of controlling FA inhibition to obtain stable nitritation is more limited since NOB adaptation has been reported (see Turk and Mavinic, 1989; and Wong-Chong and Loehr, 1978, the disclosures of which are expressly incorporated by reference herein in their entirety). Further, high temperature is known to favor growth of AOB over NOB (see Kim et al., 2008, the disclosure of which is expressly incorporated by reference herein in its entirety).

The increased activity of AOB compared to NOB at higher temperature, greater disassociation of total ammonia to free ammonia and resulting NOB inhibition at higher temperatures, combined with low DO operation (often conducted using intermittent aeration and with managed aerobic solids retention time (SRT)), results in enrichment of AOB and selective wash out of NOB. These approaches are variously described (see EP 0826639 A1, EP 0872451 B1, US 2010/0233777 A1, U.S. Pat. No. 7,846,334 B2, U.S. Pat. No. 6,485,646 B1, and WO 2012/052443 A1, the disclosures of which are expressly incorporated by reference herein in their entirety) to control NOB in 'high strength' wastewater. These methods either use suspended growth (see WO 2006/129132 A1, the disclosure of which is expressly incorporated by reference herein in its entirety), attached growth on the support media (see US 2011/0253625 A1 and EP 0931768 B1, the disclosures of which are expressly incorporated by reference herein in their entirety) or granular sludge (see Wett, 2007; and U.S. Pat. No. 7,846,334 B2, the disclosures of which are expressly incorporated by reference herein in their entirety) to accomplish ScBNR.

In spite of being effective, the role of elevated temperature to increase activity of AOB and for the control of NOB growth is not feasible in low strength mainstream processes operating under a wide range of temperatures. Consequently, NOB control in low strength wastewater remains intractable and requires careful manipulation of factors other than temperature or free ammonia.

Dissolved Oxygen:

Dissolved oxygen (DO) can play a significant role in control of NOB in low strength wastewater. Sustained nitritation with the use of low DO concentration has been observed in a variety of reactor configurations (see Sliekers et al., 2005, Wyffels et al., 2004, and Blackburne et al., 2008, the disclosures of which are expressly incorporated by reference herein in their entirety). Although, all of these reports lack account of underlying mechanisms, they resort to a hypothesis of higher oxygen affinity of AOB compared to the NOB (see Hanaki et al., 1990; Laanbroek and Gerards, 1993; and Bernet et al., 2001, the disclosures of which are expressly incorporated by reference herein in their entirety) as an explanation for the observed phenomenon (see Yoo et al., 1999, Peng et al., 2007, Lemaire et al., 2008, Gao et al., 2009, and Zeng et al., 2009, the disclosures of which are expressly incorporated by reference herein in their entirety). In a study Sin et al. (2008), the disclosure of which is expressly incorporated by reference herein in its entirety, has documented the prevalence of the belief that AOB oxygen affinity is greater than NOB oxygen affinity and that low DO operation favors AOB over NOB, however, there are studies that report the opposite (see Daebel et al., 2007, and Manser et al., 2005, the disclosures of which are expressly incorporated by reference herein in their entirety).

Transient Anoxia:

The use of transient anoxia has been a common approach to achieve NOB suppression (see Li et al., 2012; Ling, 2009, Pollice et al., 2002, Zekker et al., 2012, U.S. Pat. No. 7,846, 334 B2, EP 0872451B1, and WO 2006/129132 A1, the disclosures of which are expressly incorporated by reference herein in their entirety). Transient anoxia allows for a measured approach to control the aerobic SRT as well as to introduce a lag-time for NOB to transition from the anoxic to aerobic environment. Komaros and Dokianakis (2010), the disclosures of which are expressly incorporated by reference herein in their entirety, showed delay in NOB recovery and NOB lag adaptation in aerobic conditions following transient anoxia, thus confirming the observations of the usefulness of transient anoxia by many others (see Allenman and Irvine, 1980, Katsogiannis et al., 2003, Sedlak, 199, Silverstein and Schroeder, 1983, Yang and Yang, 2011, and Yoo et al., 1999, the disclosures of which are expressly incorporated by reference herein in their entirety). Although transient anoxia has been used successfully to control NOB in 'high strength' wastes (see Wett, 2007; and U.S. Pat. No. 7,846,334 B2, the disclosures of which are expressly incorporated by reference herein in their entirety) and the ability to use it in low strength wastes has been suggested (see Peng et al., 2004, the disclosure of which is expressly incorporated by reference herein in its entirety), the ability to control the features associated with transient anoxia remains an enigma. To summarize, strategies for controlling NOB repression in low strength wastewater, which is the basis for emerging ScBNR technologies, vary widely and a need still exists for more effective control strategies.

SUMMARY

Accordingly, the instant disclosure provides a system and method of removing nitrogen from wastewater in a reactor for biological nitrogen removal, wherein an aerobic-anoxic duration and/or a concentration of dissolved oxygen in the reactor is controlled based on a ratio of an [ammonia concentration] to a [sum of nitrite and nitrate concentrations] measured in real time. Typically, the aerobic-anoxic duration and/or the concentration of dissolved oxygen in the reactor is controlled to achieve a ratio of [ammonia concentration] to a [sum of nitrite and nitrate concentrations] that is about 1. Alternatively, the aerobic-anoxic duration and/or the concentration of dissolved oxygen in the reactor may be controlled to achieve a predetermined ratio of [ammonia concentration] to a [sum of nitrite and nitrate concentrations] that is less than or greater than 1. By employing the system and method of the instant disclosure, overall nitrogen removal is maximized because denitrification (dependent on COD input) and subsequent ammonia oxidation balance each other while also favoring AOB over NOB.

The system and method of the disclosure can be used to achieve a proper and measured control of a mainstream SND process that maximizes TIN removal through one of several nitrogen removal mechanisms including, nitrification-denitrification, nitritation-denitritation (scBNR), partial nitritation-denitritation producing an effluent stream appropriate for polishing by anammox in a separate downstream reactor, and partial nitritation-anammox in a single tank with selective anammox retention. These systems and methods use various control strategies, including: 1) real time measurement of ammonia, nitrite and nitrate, 2) operational DO and the proper use of DO setpoints controlled based on a ratio of the ammonia concentration to the nitrite+nitrate concentration measured in the reactor, 3) control of a frequency of aeration based on a ratio of the ammonia concentration to the nitrite+nitrate concentration measured in the reactor, and 4) proper implementation of transient anoxia within a wide range of apparatus (reactor configurations) and operating conditions.

DETAILED DESCRIPTION

Figure 1:
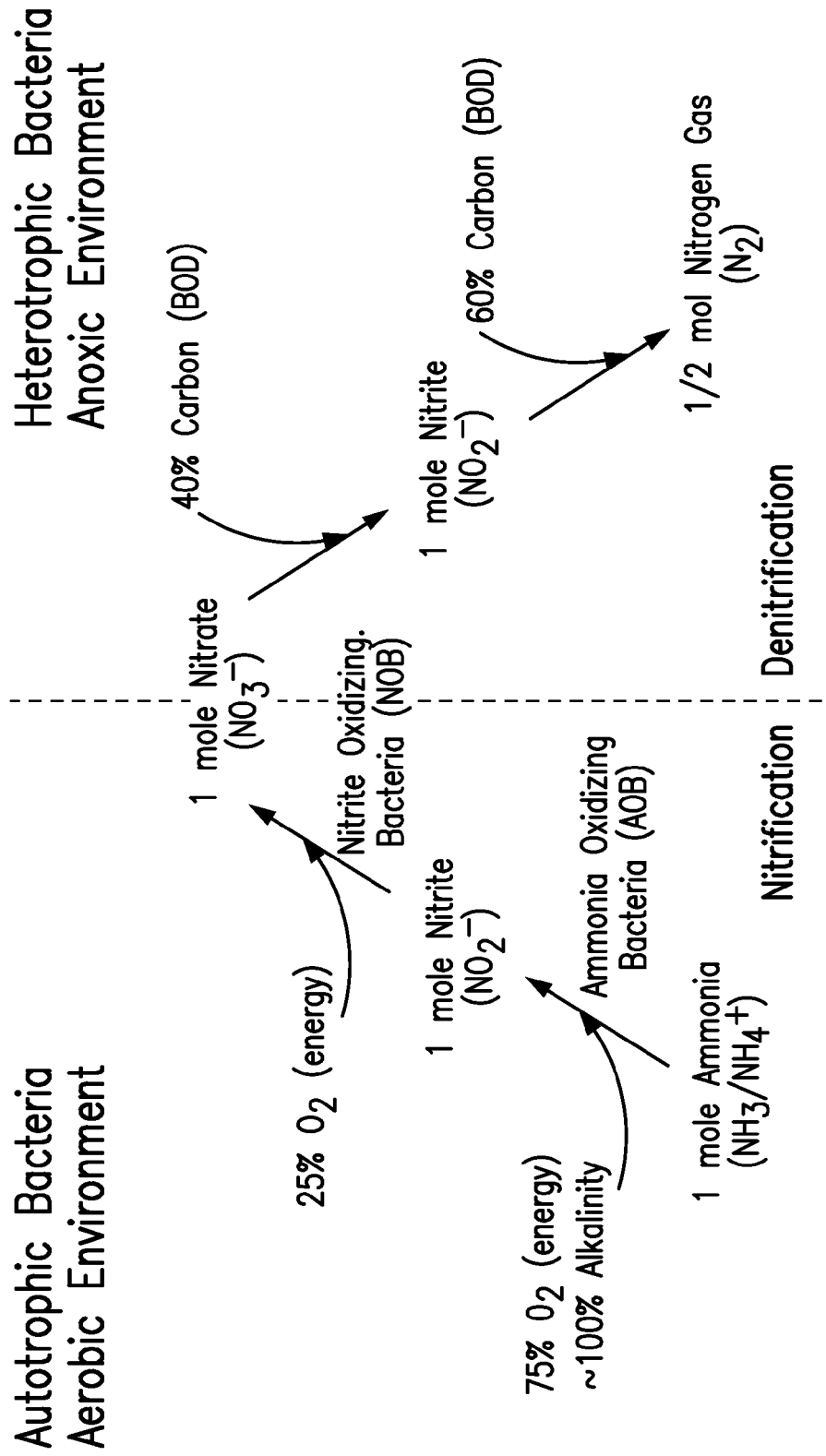
FIG. 1 is a molar flowchart showing the reactions associated with conventional nitrification and denitrification.
Figure 2:
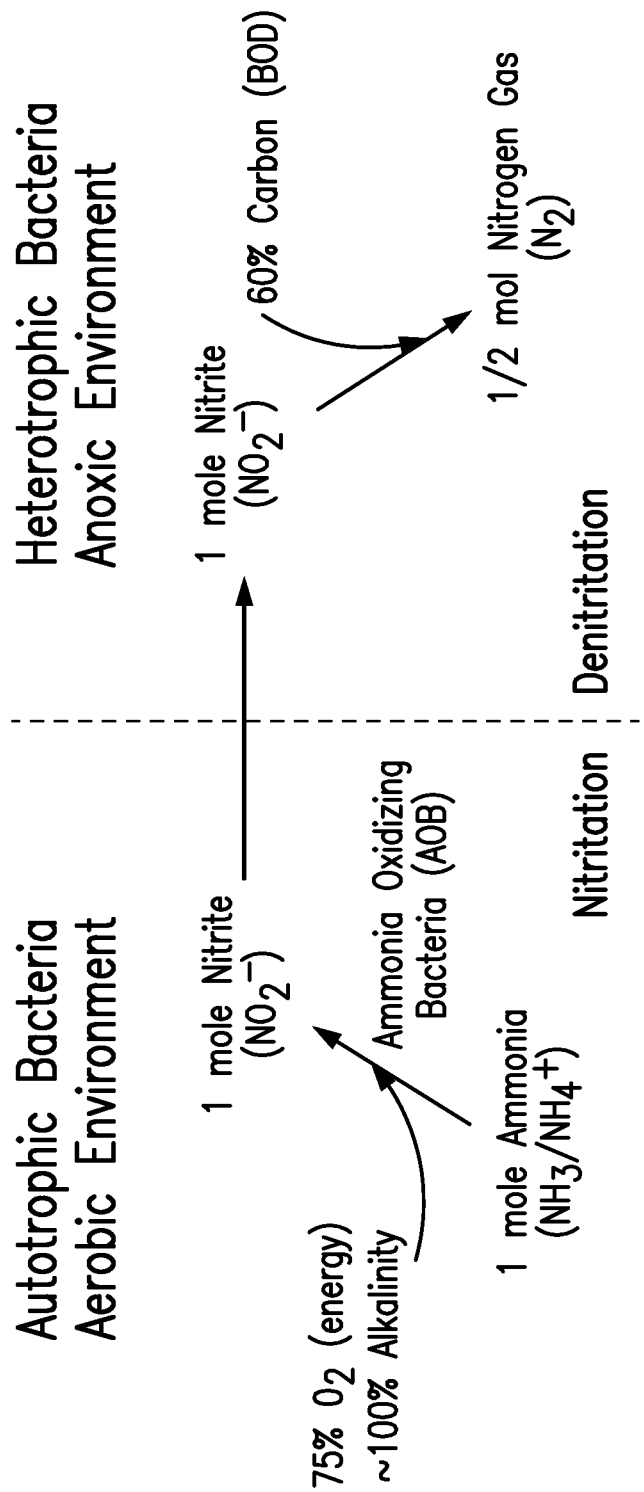
FIG. 2 is a molar flowchart showing the reactions associated with nitritation and denitritation.
Figure 3:
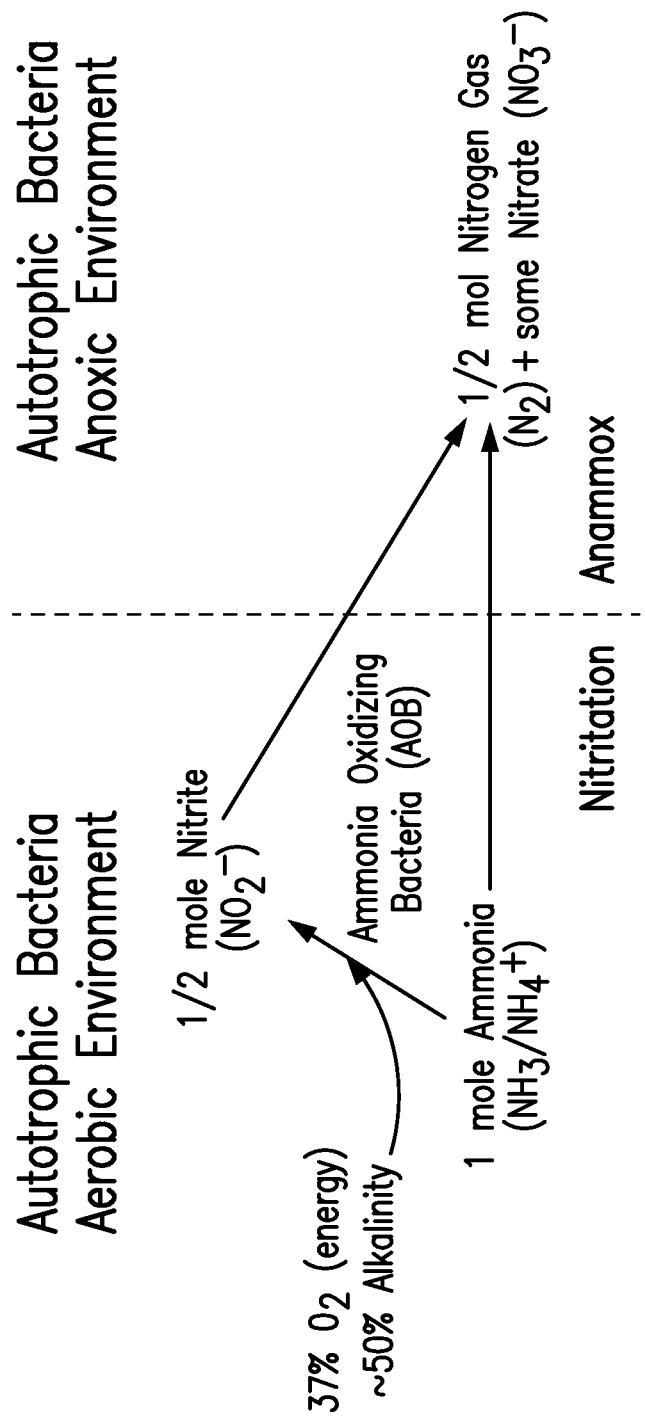
FIG. 3 is a molar flowchart showing reactions associated with deammonification.

This application describes a system and method for removing nitrogen from wastewater processed in a reactor. The system and method of the disclosure maximizes nitrogen removal while minimizing aeration and organic carbon requirements through control of transient anoxia and aerobic SRT, repression of NOB, and control of dynamic DO concentrations or aeration interval by maintaining a predetermined ratio of [an ammonia ($NH_4$) concentration] to [a sum of nitrite and nitrate concentrations]. The predetermined ratio of an ammonia concentration to a sum of nitrite and nitrate concentrations is typically 1 but can be less than or greater than 1. The controller that leverages these dynamic control strategies has been named AVN ($NH_4$ vs. $NO_x$). AVN control not only maximizes the potential for TIN removal through the normal pathway (FIG. 1), but it also provides an opportunity for NOB repression and the associated benefits in terms of TIN removal according to FIG. 2 and FIG. 3.

Figure 10:
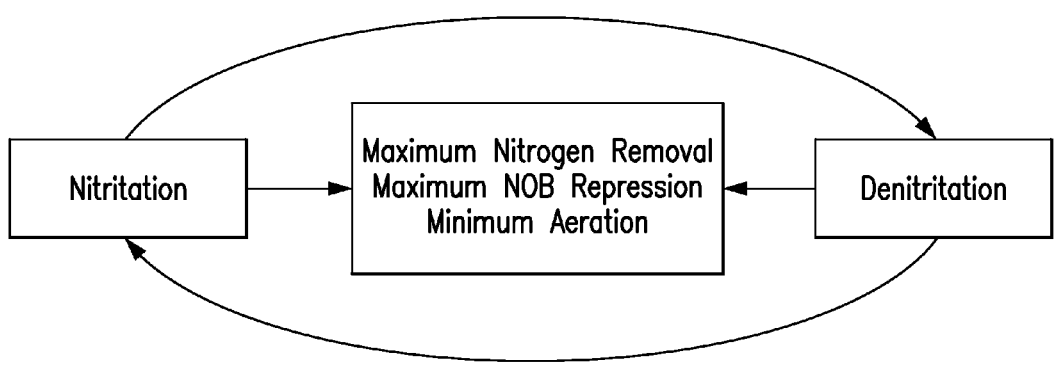
FIG. 10 is an illustration of possible effects of AVN control logic on overall system performance.

Reactor Ammonia and Nitrite+Nitrate:

The current disclosure makes use of direct measurement of ammonia, nitrite and nitrate and DO in the BNR reactor to control the aerobic and anoxic SRT and HRT as well as the reactor DO concentration to maximize ammonia oxidation and denitrification. The DO concentration or aeration interval or both are effectively controlled depending on the influent Carbon:Nitrogen (C/N) and reactor conditions such that reactions needed to eliminate nitrogen are favored at any given time. DO is directed more to ammonia oxidation over COD oxidation and available COD is used to drive denitrification at all times, thus, maximizing the overall nitrogen removal (FIG. 10). The extent of ammonia oxidation allowed by this disclosure is controlled by the availability of incoming COD for denitrification, so it is by nature that ammonia oxidation and denitrification are balanced by each other for maximum nitrogen removal. DO concentration and/or aeration duration are typically controlled to maintain approximately equal $NH_4$—N and $NO_x$—N concentrations in the reactor at all times, the amount of $NH_4$ oxidation and thus the amount of oxygen delivered is controlled based on the amount of incoming COD available to denitrify the produced $NO_x$. This minimizes aerobic heterotrophic COD consumption and maximizes the opportunity for denitrification, which requires time at low DO and available COD. The controller allows the input of offsets that would allow the $NH_4$—N or the $NO_x$—N concentration to be removed to meet specific discharge limits for these parameters. For example, the controller could be tuned to ensure compliance with an $NH_4$ limit by setting the controller to provide an effluent that contains $NH_4$ at 20-90% of the effluent NOx-N concentration.

Figure 4:
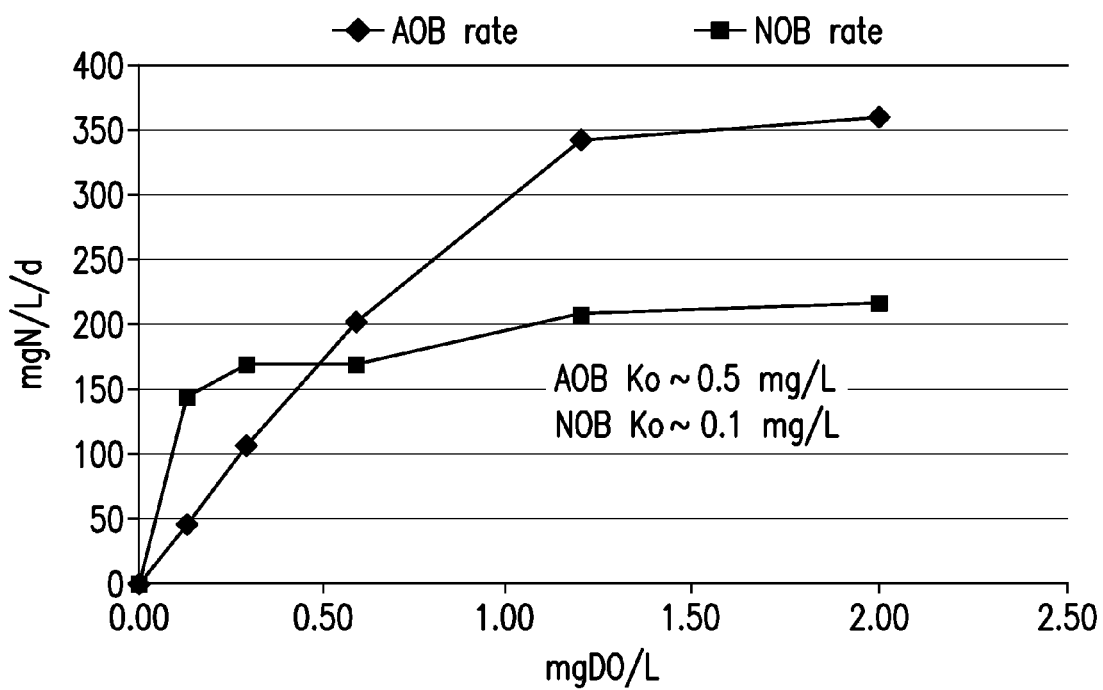
FIG. 4 is a line graph comparing collected data of $K_O$-values of AOB and NOB in a nitritation reactor of the HRSD Pilot

Dissolved Oxygen:

As described above and shown in FIG. 4, ammonia oxidation occurs at a faster rate at high DO concentrations (i.e., concentrations greater than 1 mg/L) compared to nitrite oxidation. Therefore, it is desired to operate the BNR reactor at transiently high DO concentration such that AOB growth is favored over NOB. This strategy is in opposition to the large body of literature that indicates high oxygen affinity of AOB compared to NOB at low DO concentrations.

Intermittent Aeration:

Rapid transition from a high DO into anoxia is very important considering the fact that the lag in NOB growth compared to AOB at high DO can only be exploited by imposing anoxic conditions. It means that at the end of the aerated period there will be some nitrite accumulation, for which NOB will have to compete with COD driven heterotrophic denitrifiers in scBNR and anammox in single stage deammonification processes. Therefore, DO pressure maintained in the aerated period from AOB and nitrite pressure from denitrifiers and anammox during anoxic period is greatly aided by rapid transition to anoxia.

Figure 6:
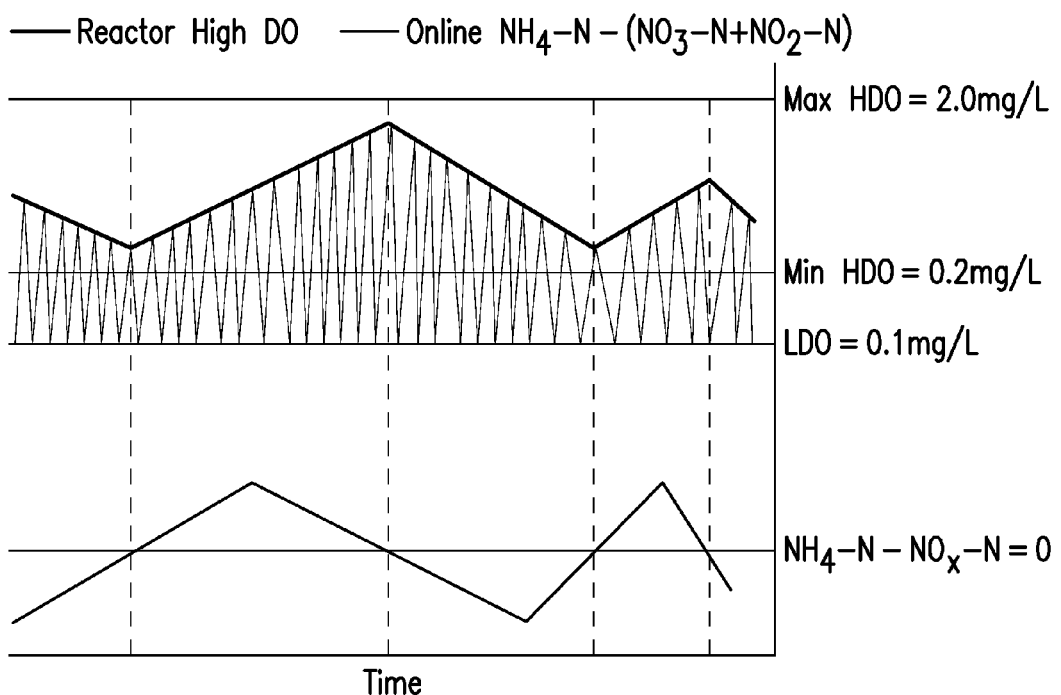
FIG. 6 is a comparison graph showing an illustration of implementation of transient anoxia logic with representative setpoints and control parameters.
Figure 8:
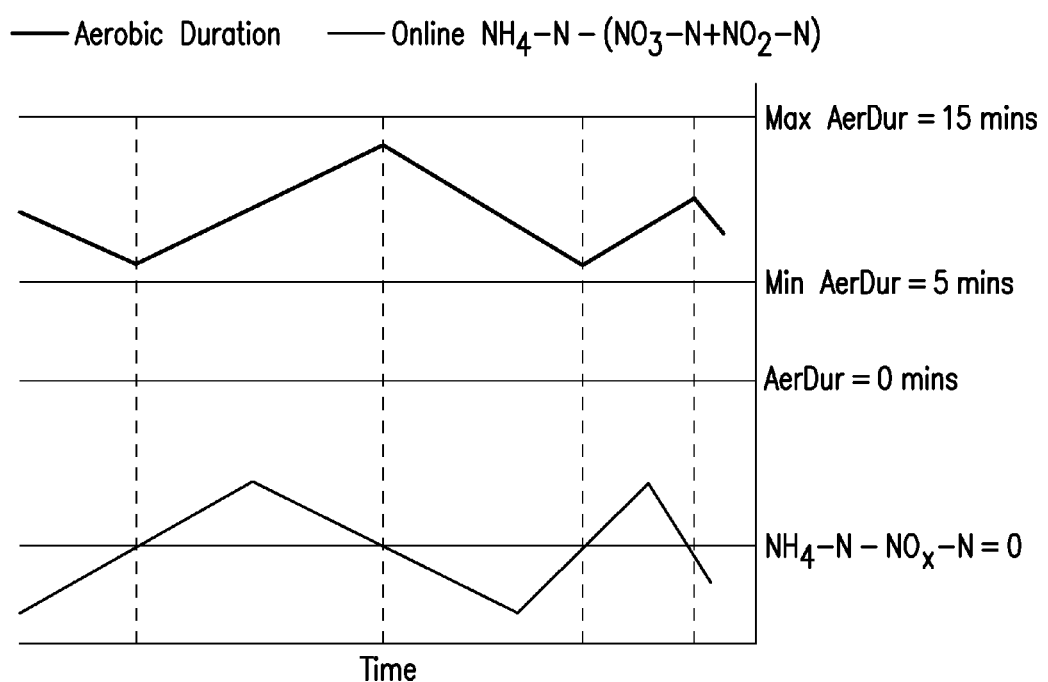
FIG. 8 is a comparison graph showing an illustration of implementation of aerobic-anoxic duration control logic with representative setpoints and control parameters.
Figure 9:
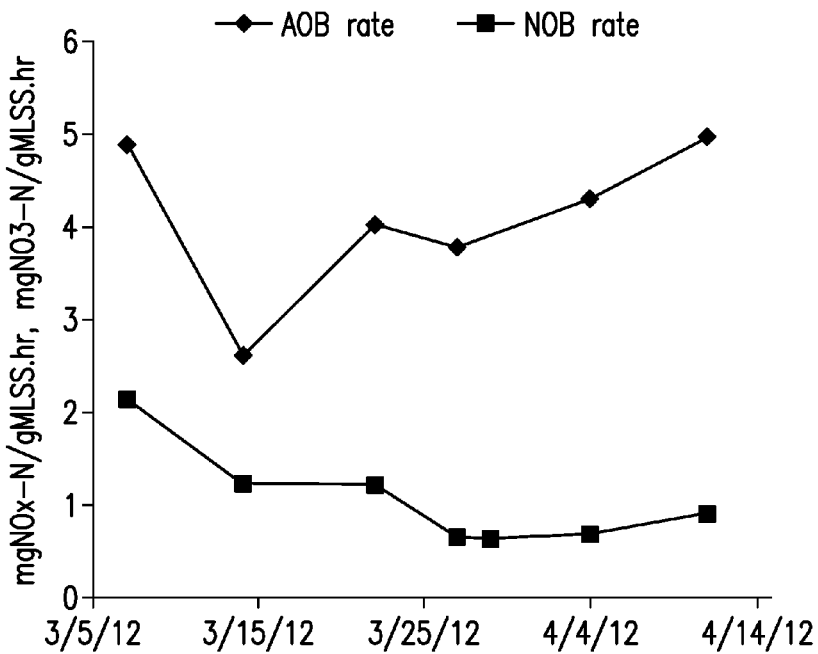
FIG. 9 is a graph comparing ammonia oxidation rates and nitrite oxidation rates in a reactor operated under strategy described in completely mixed process.

Maintaining higher oxygen uptake rate (OUR) is the key for implementation of rapid transient anoxia. It is feasible to operate a BNR reactor at high OUR conditions by increasing MLSS concentration and COD input such that DO is rapidly consumed following onset of anoxia. The use of direct DO, ammonia, nitrite and nitrate measurement to control aerobic and anoxic SRT and HRT in a BNR reactor has been demonstrated in FIGS. 6 and 8 which show rapidly alternating aerobic and anoxic conditions in a reactor. Under this strategy, the $NH_4$—N concentration is measured and maintained close to the $NO_x$—N concentration, or at any offset needed. Aeration is provided for ammonia oxidation such that the reactor $NH_4$—N concentration approximately matches the reactor $NO_x$—N concentration. This maintains elevated $NH_4$ concentration in the reactor at all times or locations ensuring that AOB rates are kept high. Hence, known NOB repression strategies may be exploited with use of a robust control algorithm based on direct $NH_4$, $NO_2$, $NO_3$ and DO signals. FIG. 9 demonstrates the performance of this strategy in controlling NOB to achieve ScBNR in a nitrite-shunt process.

Specific controls are now described.

Aerobic SRT and DO Setpoint:

The aerobic SRT is controlled through two approaches. An increase in solids wasted decreases the total and aerobic SRT. A second approach to decreasing the aerobic SRT is by increasing the anoxic time step during transient anoxia. In an intermittently aerated (in time or space) BNR reactor operated under AVN control strategy, the aerobic SRT is determined by aeration needs of AOB to oxidize ammonia to nitrite or nitrate such that $NH_4$—N and $NO_x$—N concentration remain equal. For example, if AOB's ammonia oxidation rate is lower, more aeration (time or higher DO concentration or both) will be required to maintain this condition compared to when AOB rates are higher. In such a scenario, intentional lowering of the total SRT gradually results in a reduction in AOB ammonia oxidation rate at a certain DO value. Consequently, AOB require more aeration to increase their growth rate and to meet the desired condition ($NH_4$—N=$NO_x$—N) causing the operational high DO set point (in time) and aerobic HRT (in space) to increase and be at a point where the growth of AOB are favored over NOB.

Aggressive SRT control is not commonly accepted as a means for achieving nitrite shunt, which also coincides with inability to sustain stable NOB repression. When the BNR reactor is operated at high DO set points, AOB grow faster than NOB, which allows the system to be operated at low SRT further disadvantaging NOB. In addition, the application of aggressive SRT pressure is easily controlled according to this disclosure. Since the ammonia, nitrite and nitrate concentrations determine the operational high DO set points or aeration duration (in time) and aerated fraction (in space), it is a simple matter to control the total SRT such that the DO remains at a high concentration, in excess of 1 mg/L.

Transition to Anoxia Control:

To extend this disclosure of AVN control to NOB repression, a more rapid transition between aerobic setpoint and anoxia is desirable to minimize the time available for NOB to grow favorably over AOB. There are at least three approaches to increase the oxygen uptake rates to transition to anoxia. One approach is to operate the reactor at higher mixed liquor solids concentration, such that there are more organisms seeking air in the same volume. Another approach is to use influent COD to allow for the scavenging of oxygen during the transition periods. A third approach is to increase the temperature and thus the growth rates of all organisms. The key feature is to allow for high oxygen uptake rates to transition from oxic to anoxic conditions.

Transient Anoxia Frequency (TAF) Control:

To extend this disclosure of AVN control to NOB repression, it is desirable to have a high TAF to allow for rapid changes between aerobic and anoxic conditions while maintaining the same overall aerobic SRT. For example a 5 minute aerobic/anoxic cycle is preferred over a 15 minute aerobic/anoxic cycle, which is preferred over a 30 minute aerobic/ anoxic cycle. A highest practicable TAF allows for disruption of NOB while allowing for preferential growth of AOB in the aerobic phase and denitrifying organisms or anammox organisms in the anoxic phase. There are constraints to maximizing this frequency. The increase in frequency, maximum value, is eventually constrained in the aerobic step by the time required to allow oxygen to achieve its setpoint and then to sufficiently oxidize ammonia. Additionally, a minimum anoxic time is required to allow denitrifying or anammox organisms to convert nitrite to nitrogen gas.

Reactor Configurations:

Several apparatus are available to execute this AOB oxidation and NOB repression framework, including complete mixed reactors, sequencing batch reactors, oxidation ditches and plug flow reactors. It should be noted that the reactor apparatus can be adjusted to deliver the control features for achieving SRT, ammonia oxidation requirements, high DO concentrations and anoxia transitions, where possible, by providing mechanical and hydraulic flexibility. Swing zones or reactors to accommodate variable flows and loads that are typical to a wastewater treatment process can be provided. Apart from suspended growth reactors, biofilm, granular sludge or hybrids of these reactors are also feasible. Finally, the solid-liquid separation could occur using any separation device including clarifiers, membranes or dissolved air floatation tanks.

Plug flow reactors are characterized as continuously fed reactors with very high length to width ratio and can be simulated as a series of completely mixed reactors where the pollutant concentration decreases along the flow pathway across the reactor's length (i.e. concentration gradient). In plug flow continuously fed reactors, which are more commonly used in large treatment plants, the process controls to achieve AVN control can be addressed using two configurations: (1) controlling aeration in space by alternating between aerobic and anaerobic zones; and (2) controlling aeration in time by cycling air throughout the reactor in "air on" and "air off" sequence similar to a SBR configuration.

AVN control can be integrated in various reactor configurations to achieve maximum nitrogen removal through nitrification-denitrification, nitritation-denitrification, and partial nitritation-anammox.

AVN control can be implemented in a single reactor or reactors in series with goal to achieve nitrogen removal through nitrification and denitrification when influent C/N is high. If the goal is to further improve nitrogen removal, provided the influent C/N is sufficient, the AVN control could also be used to repress NOB enabling ScBNR/nitritation-denitritation in any single reactor configuration or reactors in series. When influent C/N is low, AVN control can be used to realize autotrophic nitrogen removal through partial nitritation and anammox in any single reactor configuration or reactors in series, assuming selective anammox retention such as cyclone separation (US 2011/0198284 A1). Controls allow for appropriate reactor concentrations of $NH_4$ and $NO_2$ at all times and locations to allow for anammox growth. Above-mentioned reactor configurations could be used to feed a separate fully anoxic anammox reactor following the solids separation device, since with NOB repression effluent itself contains the right blend of $NH_4$ and $NO_2$ to serve as a substrate for anammox. This fully anoxic anammox reactor can be of any configuration, including but not limited to moving bed biofilm reactor, granular sludge reactor, suspended growth reactor, biologically active granular media filter, and membrane bioreactor.

Control Strategies

Several control strategies are available that can be applied in the above-mentioned reactor configurations that make use of features of this disclosure to achieve maximum TIN removal and can be extended to NOB repression. A few exemplary strategies are described below, optimized for various configurations.

Control Strategy A: The first control strategy under which the operational DO is variable and controlled by the $NH_4$—N and $NO_x$—N concentrations in the BNR reactor will optimize the DO for high ammonia oxidation rate and under anoxia, heterotrophic denitrification or anammox-driven ammonia oxidation. This approach is valid in a wide range of reactor configurations including plug flow, complete mix, complete mix reactors in series, and sequencing batch reactor. Under this approach the DO cycles between the low DO setpoint (which is fixed) and a variable high DO setpoint, usually greater than 1 mg/L and controlled by reactor $NH_4$—N compared to $NO_x$—N concentrations. An aggressive aerobic SRT is maintained to increase the demand for oxygen, thus allowing for the controller to automatically increase the DO levels to greater than 1 mg/L. In this control strategy, the aerobic and anoxic periods are dictated by the AOB's aeration requirement to meet the objective for $NH_4$—N to be approximately equal to $NO_x$—N, as opposed to being fixed.

Figure 11:
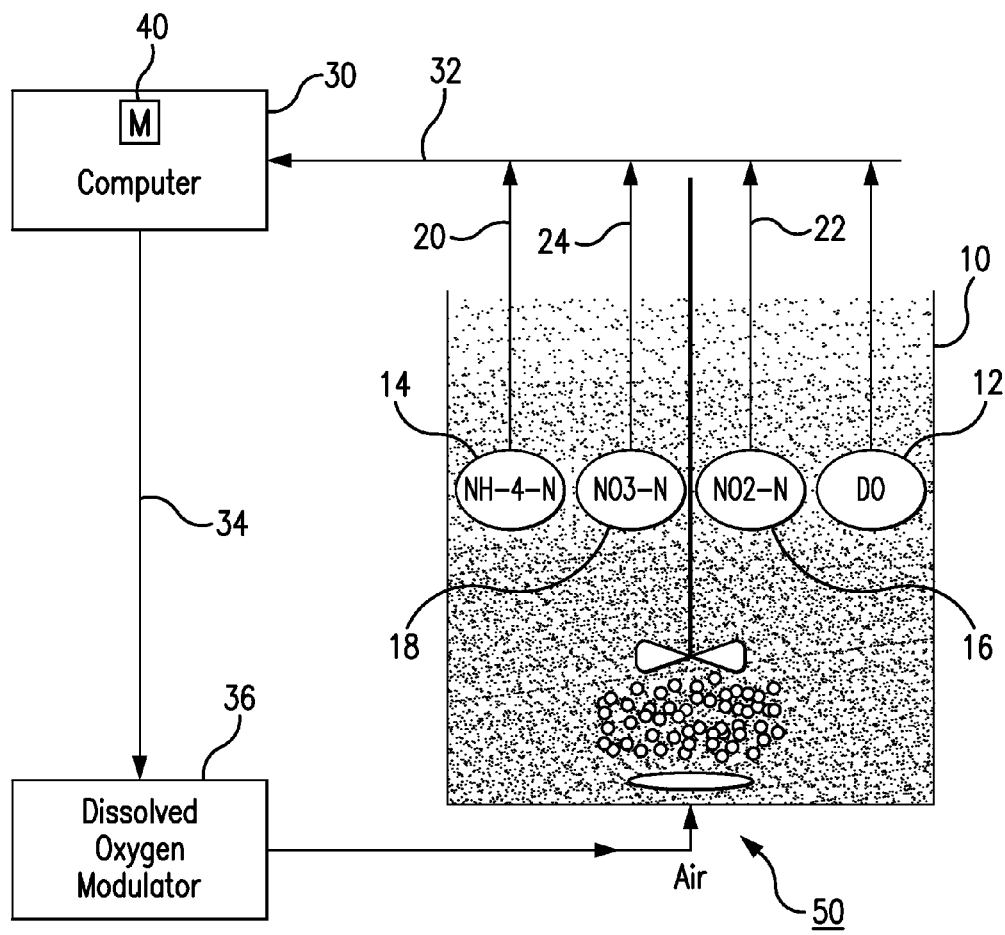
FIG. 11 is a lateral cross-sectional view of a BNR reactor fitted with a mechanical mixer, an air diffuser, an ammonia sensor, a nitrite sensor, a nitrate sensor and a dissolved oxygen sensor.

In this exemplary embodiment, a BNR reactor 10 (FIG. 11) may be fitted with DO, ammonia, nitrite and nitrate probes (or sensors) 12, 14, 16, 18. It will be possible to have any reactor configuration as described in the next subsection where the control can occur either in time or in space. In case of multiple or plug flow reactors, multiple DO probes are installed along each major section along a train, while an ammonia, nitrite and nitrate probe will be installed strategically in a latter reactor or section, to manage reaction rates such that small amounts of ammonia concentration remain at the end of the reactor and such that the reactor effluent contains $NH_4$—N concentrations approximately equal to $NO_x$—N.

The disclosure provides a system for removing nitrogen in a reactor for biological nitrogen removal from wastewaters. The system comprises: a reactor 10; an ammonia sensor (or probe) 14 that senses a concentration of ammonia in the reactor 10 in real time and generates an ammonia concentration signal 20; a nitrite sensor (or probe) 16 that senses a concentration of nitrite in the reactor 10 in real time and generates a nitrite concentration signal 22; a nitrate sensor (or probe) 18 that senses a concentration of nitrate in the reactor 10 in real time and generates a nitrate concentration signal 24; a controller 30 that receives the ammonia concentration signal, nitrite concentration signal and nitrate concentration signal via one or more communication links 32 and generates one or more instructions, which the controller 30 supplies to dissolved oxygen supply and control system (not illustrated) via communication link(s) 34, for increasing, decreasing or maintaining a concentration of dissolved oxygen in the reactor 10 by controlling concentrations of ammonia, nitrite, and nitrate based on a ratio of the [concentration of ammonia] to [a sum of the concentrations of nitrite and nitrate]; and a dissolved oxygen modulator 36 that supplies dissolved oxygen to the reactor 10 under control of the controller 30 based on the ratio of the [concentration of ammonia] to [the sum of the concentrations of nitrite and nitrate]. The dissolved oxygen modulator 36 may be coupled to the controller 30 via the one or more communication links 34. The system may further comprise one or more electronically (or mechanically) controlled valves that may be linked to the controller via communication links. The controller may generate instructions for increasing the concentration of dissolved oxygen if the ratio of the [concentration of ammonia] to [the sum of the concentrations of nitrite and nitrate] is greater than 1. The controller 30 may generate instructions for decreasing the concentration of dissolved oxygen in the reactor 10 if the ratio of the [concentration of ammonia] to [the sum of the concentrations of nitrite and nitrate] is less than 1. The controller 30 may generate instructions for maintaining the concentration of dissolved oxygen in the reactor 10 if the ratio of the [concentration of ammonia] to [the sum of the concentrations of nitrite and nitrate] is 1.

The controller may be one or more computers. A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

The controller 30 may include a computer-readable medium 40 that includes a computer program having code sections or segments, which when executed by the computer(s) 30, cause each of the processes described herein to be carried out. A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

According to another aspect of the disclosure, the system for removing nitrogen in a reactor for biological nitrogen removal from wastewaters may comprise: a reactor; an ammonia sensor (or probe) that senses a concentration of ammonia in the reactor in real time and generates an ammonia concentration signal; a nitrite sensor (or probe) that senses a concentration of nitrite in the reactor in real time and generates a nitrite concentration signal; a nitrate sensor (or probe) that senses a concentration of nitrate in the reactor in real time and generates a nitrate concentration signal; a controller that receives the ammonia concentration signal, nitrite concentration signal and nitrate concentration signal via one or more communication links and generates instructions, which may be supplied to one or more valves and/or an aerator, for increasing, decreasing or maintaining DO concentration and aerobic-anoxic duration within the reactor based on a ratio of the [concentration of ammonia] to [a sum of the concentrations of nitrite and nitrate]; and the aerator that aerates the reactor at a frequency controlled by the controller, wherein the frequency is based on the ratio of the [concentration of ammonia] to [the sum of the concentrations of nitrite and nitrate]. The controller may generate instructions for increasing DO concentration or the aerobic duration (or decreasing the anoxic duration) if the ratio of the [concentration of ammonia] to [the sum of the concentrations of nitrite and nitrate] is greater than 1. The controller may generate instructions for decreasing DO concentration or the aerobic duration (or increasing the anoxic duration) treatment if the ratio of the [concentration of ammonia] to [the sum of the concentrations of nitrite and nitrate] is less than 1. The controller may generate instructions for maintaining DO concentration and aerobic-anoxic duration if the ratio of the [concentration of ammonia] to [the sum of the concentrations of nitrite and nitrate] is 1.

Figure 5:
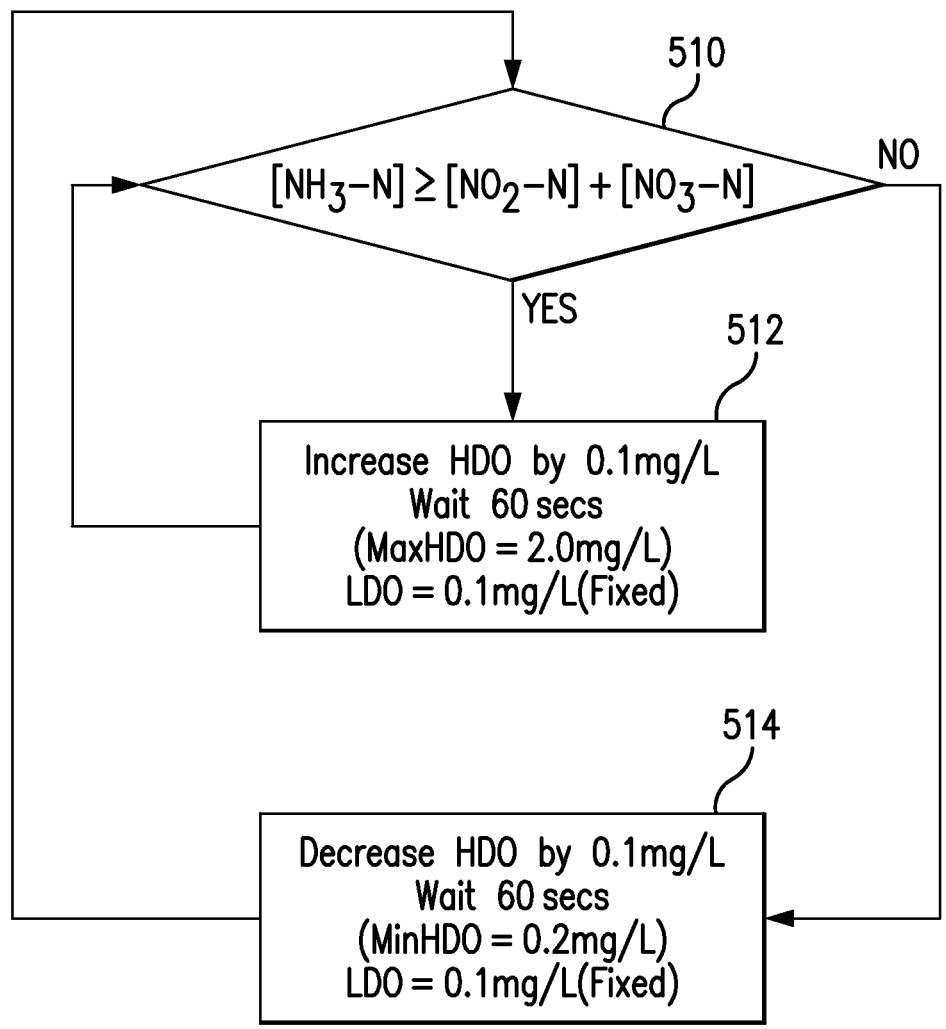
FIG. 5 is a flowchart showing a DO control algorithm based on ammonia, nitrite, nitrate and DO concentrations.

In an example, the dissolved oxygen concentration and/or the duration of the aerobic and anoxic periods is regulated by switching an air control valve 50 either ON or OFF, based on a high DO (HDO) and low DO (LDO) setpoint. For instance, to increase the duration of an aerobic period and decrease the duration of an anoxic period, the air control valve 50 can be switched ON. In contrast, to decrease the duration of an aerobic period and increase the duration of an anoxic period, the air control valve 50 can be switched OFF. The LDO setpoint is fixed at near zero (0.001 to 0.1 mg/L) whereas HDO is variable (based on $NH_4$—N, $NO_3$—N and $NO_2$—N measured real-time in the tank) from 0.3 mg/L (MinHDO) to 3.0 mg/L (MaxHDO). The MaxHDO is set at 2.0-3.0 mg/L, since adding more aeration beyond this point is believed to provide no added benefit in terms of ammonia oxidation rate. When the $NH_4$—N in the reactor 10 is greater than the $NO_x$—N (YES from S10, FIG. 5), the HDO is increased (S12) until the $NH_4$—N gets below $NO_x$—N. When the $NH_4$—N concentration is lower than the $NO_x$—N (NO from S10), the HDO is decreased (S14) until the $NH_4$—N concentration becomes equal to or greater than the $NO_x$—N. Offsets can be applied as discussed above to allow for a higher effluent $NH_4$ versus NO or vice versa as required. Aggressive SRT control is accomplished by wasting solids such that the HDO setpoint is consistently greater than 1 mg/L. The total SRT can also be controlled automatically by maintaining the waste flow rate based on reactor DO concentration over certain averaging time.

Figure 7:
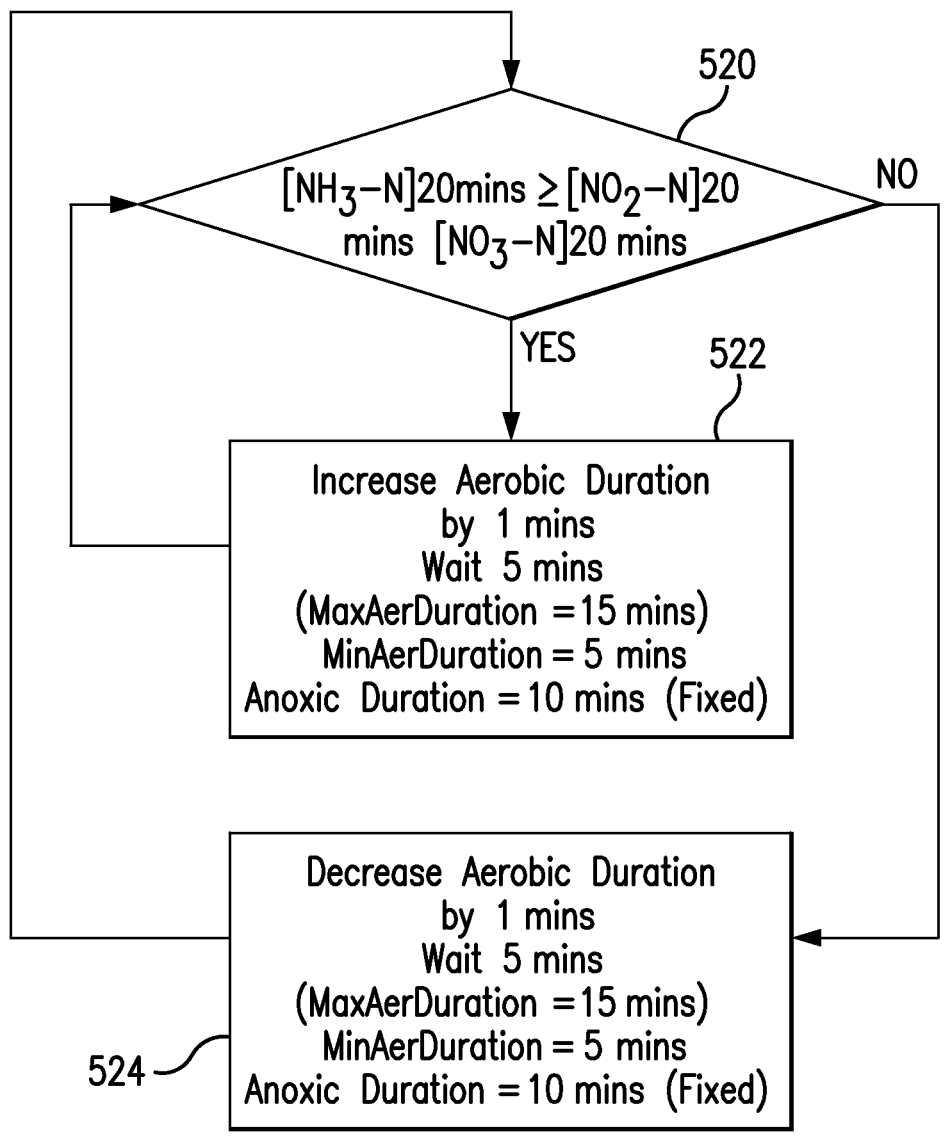
FIG. 7 is a flowchart showing an aerobic duration control algorithm based on ammonia, nitrite, nitrate and DO concentrations.

Control Strategy B—In this strategy, DO set point is fixed while aerobic and anoxic duration is variable. The total aerobic-anoxic cycle time can be maintained at certain set point while allowing aerobic and anoxic durations to vary. In another instance, anoxic duration can be fixed, allowing the controller to modify only the aerobic duration, such that overall anoxic+aerobic duration remains dynamic depending on the nitrogen removal potential. Mechanical mixing (60, FIG. 11) should be provided when aeration (50) is not provided. In the example illustrated in FIG. 7, aerobic duration is variable between 5 minutes to 15 minutes while anoxic duration is 10 minutes. When the $NH_4$—N in the reactor is greater than the $NO_x$—N (YES from S20), the aerobic duration is increased (S22) until the $NH_4$—N gets below $NO_x$—N. When the $NH_4$—N concentration is lower than the $NO_x$—N (NO from S20), the aerobic duration is decreased (S24) until the $NH_4$—N concentration becomes equal to or greater than the $NO_x$—N. Offsets can be applied as discussed above to allow for a higher effluent $NH_4$ versus NO or vice versa as required.

Control Strategy C: AVN control can also be used in plug flow tank with multiple aerobic and anoxic swing zones in series. AVN control affects which zones in series are maintained anoxic or aerobically to achieve to the control objective.

EXAMPLES

Figures 12, 13:
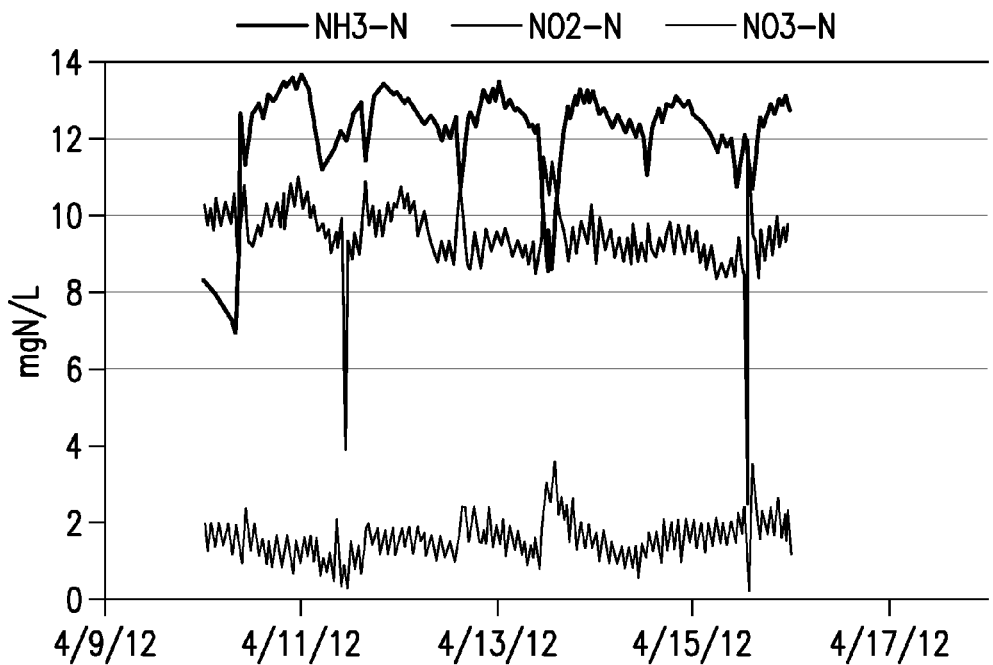
FIG. 12 illustrates real time ammonia, nitrite and nitrate measurements in a nitritation reactor operated under AVN control.
FIG. 13 illustrates TIN removal performance of a nitritation reactor operated under AVN control.

The system for removing nitrogen in a reactor for biological nitrogen removal from wastewaters of the present disclosure was operated with 2-3 hr hydraulic residence time (HRT), ~5 day SRT, 3500±500 mg/L mixed liquor suspended solids (MLSS) at 25° C. The reactor was operated under the AVN control strategies set forth in a preceding paragraph, which starts with "In an example," and shown in FIGS. 5 and 7. FIG. 9 represents the NOB repression that was observed. The AVN controller performance is demonstrated in FIG. 12. As seen in FIG. 13, high TIN removal, wherein the removal was dependent on COD input, was also achieved using the same operating conditions.

RELEVANT ACRONYMS

AOB: ammonia oxidizing bacteria
BNR: biological nutrient removal
COD: chemical oxygen demand
C/N: Carbon to nitrogen ratio
DO: dissolved oxygen
FA: free ammonia
HDO: high DO
HRT: hydraulic residence time
LDO: low DO
NOB: nitrite oxidizing bacteria
$NO_x$: Nitrate
$NO_x$—N: Nitrate-nitrogen plus Nitrite-nitrogen
$NO_3$—N: Nitrate-nitrogen
$NO_2$—N: Nitrite-nitrogen
$NO_3$: Nitrate
$NO_2$: Nitrite
$NH_4$—N: Ammonia-nitrogen
OUR: oxygen uptake rate
ScBNR: short-cut biological nitrogen removal
SRT: solids retention time
TAF: Transient Anoxia Frequency
TIN: Total Inorganic Nitrogen
TN: Total Nitrogen

DOCUMENTS CITED IN APPLICATION

U.S. PATENT DOCUMENTS

| 2010/0233777 A1 | September 2010 | Chandran et al |
| 6,485,646 B1 | November 2002 | Dijkman et al. |
| 2011/0198284 A1 | August 2011 | Nyhuis |

-continued

U.S. PATENT DOCUMENTS

| 2011/0253625A1 | October 2011 | Takeda et al. |
| 7,846,334 B2 | December 2010 | Wett |

FOREIGN PATENT DOCUMENTS

| EP | 0931768B1 | September 2003 |
| EP | 0826639A1 | March 1998 |
| EP | 0872451B1 | December 2002 |
| WO | 2006/129132A1 | December 2006 |
| WO | 2012/052443A1 | April 2012 |

OTHER PUBLICATIONS

Abeling and Seyfried (1992) Water Science and Technology 26(5-6): 1007-1015.
Alleman and Irvine (1980) Water Research 14: 1483-1488.
Anthonisen et al. (1976) Journal of Water Pollution Control Federation 48: 835-852.
Bernet et al. (2001) Journal of Environmental Engineering 127: 266-271.
Blackburne et al. (2008) Biodegradation 19(2): 303-312.
Ciudad et al. (2005) Process Biochemistry 40(5): 1715-1719.
Daebel et al. (2007) Water Research 41: 1094-1102.
Daigger and Littleton (2000) Water Environment Research 72: 330
Daigger et al. (2007) Water Environment Research 79: 375
Fux et al. (2002) Journal Biotechnology 99(3): 295-306.
Gao et al. (2009) Bioresource Technology 100: 2298-2300.
Gee and Kim (2004) Water Science and Technology 49(5-6): 47-55.
Guo et al. (2009) Process Biochemistry 44: 979-985
Hanaki et al. (1990) Water Research 24: 297-302.
Helling a et al. (1998) Water Science and Technology 37(9): 135-142.
Hippen et al. (1997) Water Science and Technology 35 (10): 111-120.
Ju et al. (2007) Water Environment Research 79(8): 912-920.
Katsogiannis et al. (2003) Water Science and Technology 47(11): 53-59.
Kim et al. (2008) Process Biochemistry 43(2): 154-160.
Kornaros and Dokianakis (2010) Environmental Science and Technology 44: 7245-7253.
Laanbroek and Gerards (1993) Archives of Microbiology 159: 453-459.
Lemaire et al. (2008) Biotechnology and Bioengineering 100 (6): 1228-1236.
Li et al. (2012) Process Safety and Environmental Protection. doi:10.1016/j.psep.2012.05.009
Ling (2009) Proceedings of 2nd TWA specialized Conference on nutrient Management in Wastewater treatment Processes pp. 403-410.
Manser et al. (2005) Water Research 39(19): 4633-4642.
Peng et al. (2004) Water Science and Technology 50(10): 35-43.
Peng et al. (2007) Chinese Journal of Chemical Engineering 15(1): 115-121.
Pollice et al. (2002) Water Research 36(10): 2541-2546.
Sedlak (1991) Phosphorus and Nitrogen Removal from Municipal Wastewater: Principles and Practice (2nd ed.).
Silverstein and Schroeder (1983) Journal of Water Pollution Control Federation 55: 377-384.

Sin et al. (2008) Water Science and Technology 58(6): 1155-1171.

Slickers et al. (2005) Applied Microbial Biotechnology 68: 808-817.

Turk and Mavinic (1989) Water Research 23: 1383-1388.

Turk and Mavinic (1986) Canadian Journal of Civil Engineering 13: 600-605.

van Dongen et al. (2001) Water Science and Technology 44(1): 153-160.

Wett (2006) Water Science and Technology 53(12): 121-128.

Wett (2007) Water Science and Technology 56(7): 81-88.

Wett (2010) Water Science and Technology 61(8): 1915-1922.

Wong-Chong and Loehr (1978) Water Research 12(8): 605-609.

Wyffels et al. (2004) Water Science and Technology 49(5-6): 57-64.

Yang and Yang (2011) Journal of Hazardous Materials 195: 318-323.

Yoo et al. (1999) Water Research 33: 145-154.

Yu et al. (2000) Journal of Environmental Engineering 126: 943-948.

Zekker et al. (2012) Environmental Technology 33(4-6): 703-710.

Zeng et al. (2008) Chemical Engineering and Technology 31(4): 582-587.

Zeng et al. (2009) Enzyme and Microbial Technology 45(3): 22

The invention claimed is:

1. A system for removing nitrogen from a reactor for biological nitrogen removal from wastewaters comprising: a) a reactor; b) an ammonia sensor that senses a concentration of ammonia in the reactor in real time and generates an ammonia concentration signal; c) a nitrite sensor that senses a concentration of nitrite in the reactor in real time and generates a nitrite concentration signal; d) a nitrate sensor that senses a concentration of nitrate in the reactor in real time and generates a nitrate concentration signal; e) a controller that receives the ammonia concentration signal, nitrite concentration signal and nitrate concentration signal and generates instructions for increasing, decreasing or maintaining a concentration of dissolved oxygen in the reactor based on a ratio of the [concentration of ammonia] to [a sum of the concentrations of nitrite and nitrate]; f) a dissolved oxygen modulator that supplies dissolved oxygen to the reactor under control of the controller based on the ratio of the [concentration of ammonia] to [the sum of the concentrations of nitrite and nitrate], wherein the system is configured to provide nitrite oxidizing bacteria repression and the production of an effluent stream for post-anammox polishing; and g) a plurality of anammox organisms in a post-anammox polishing reactor.

2. The system of claim 1, wherein the controller generates instructions for increasing the concentration of dissolved oxygen if the ratio of the [concentration of ammonia] to [the sum of the concentrations of nitrite and nitrate] is greater than 1.

3. The system of claim 1, wherein the controller generates instructions for decreasing the concentration of dissolved oxygen if the ratio of the [concentration of ammonia] to [the sum of the concentrations of nitrite and nitrate] is less than 1.

4. The system of claim 1, wherein the controller generates instructions for maintaining the concentration of dissolved oxygen if the ratio of the [concentration of ammonia] to [the sum of the concentrations of nitrite and nitrate] is 1.

5. The system of claim 1, wherein the controller generates instructions for increasing or decreasing or maintaining the concentration of dissolved oxygen to maintain a ratio of [a sum of the concentrations of nitrite and nitrate] to [concentration of ammonia] that is from about 1.18 to about 1.45.

6. The system of claim 5, wherein the controller generates instructions for increasing or decreasing or maintaining the concentration of dissolved oxygen to maintain the ratio of [the sum of the concentrations of nitrite and nitrate] to the [concentration of ammonia] that is equal to about 1.32.

7. A system for removing nitrogen from a reactor for biological nitrogen removal from wastewaters comprising: a) a reactor; b) an ammonia sensor that senses a concentration of ammonia in the reactor in real time and generates an ammonia concentration signal; c) a nitrite sensor that senses a concentration of nitrite in the reactor in real time and generates a nitrite concentration signal; d) a nitrate sensor that senses a concentration of nitrate in the reactor in real time and generates a nitrate concentration signal; e) a controller that receives the ammonia concentration signal, nitrite concentration signal and nitrate concentration signal and generates instructions for increasing, decreasing or maintaining a duration of aerobic and anoxic period within the reactor based on a ratio of the [concentration of ammonia] to [a sum of the concentrations of nitrite and nitrate]; f) a dissolved oxygen modulator that supplies the dissolved oxygen to the reactor to control the duration of aerobic and anoxic periods, wherein the dissolved oxygen modulator is under the control of the controller and controls the duration of the aerobic and anoxic periods based on the ratio of the [concentration of ammonia] to [the sum of the concentrations of nitrite and nitrate]; and g) a plurality of anammox organisms that provides nitrite oxidizing bacteria repression, wherein the system is configured to produce an effluent stream, wherein said effluent stream is produced such that anammox process bacteria can be selectively retained.

8. The system of claim 7, wherein the controller generates instructions for increasing the duration of the aerobic period and/or decreasing the duration of the anoxic period if the ratio of the [concentration of ammonia] to [the sum of the concentrations of nitrite and nitrate] is greater than 1.

9. The system of claim 7, wherein the controller generates instructions for decreasing the duration of the aerobic period and/or increasing the duration of the anoxic period if the ratio of the [concentration of ammonia] to [the sum of the concentrations of nitrite and nitrate] is less than 1.

10. The system of claim 7, wherein the controller generates instructions for maintaining the duration of the aerobic period and/or the duration of the anoxic period if the ratio of the [concentration of ammonia] to [the sum of the concentrations of nitrite and nitrate] is 1.

11. The apparatus of claim 1, further comprising a supply of acetate or acetic acid or other organic substrate that is added to accomplish denitratation (nitrate reduction to nitrite) and subsequent anammox growth on the provided ammonia and denitratation-produced nitrite.

12. The apparatus of claim 1, wherein the effluent stream contains approximately equal proportions of ammonia and nitrite on an as nitrogen basis, such that further nitrogen removal can be accomplished using anammox in a fully anoxic suspended or biofilm process.

13. A system for removing nitrogen from a reactor for biological nitrogen removal from wastewaters comprising: a) a reactor; b) an ammonia sensor that senses a concentration of ammonia in the reactor in real time and generates an ammonia concentration signal; c) a nitrite sensor that senses a concentration of nitrite in the reactor in real time and generates a nitrite concentration signal; d) a nitrate sensor that senses a concentration of nitrate in the reactor in real time and generates a nitrate concentration signal; e) a controller that receives the ammonia concentration signal, nitrite concentration signal and nitrate concentration signal and generates instructions for increasing, decreasing or maintaining a concentration of dissolved oxygen in the reactor based on a ratio of the [concentration of ammonia] to [a sum of the concentrations of nitrite and nitrate]; f) a dissolved oxygen modulator that supplies dissolved oxygen to the reactor under control of the controller based on the ratio of the [concentration of ammonia] to [the sum of the concentrations of nitrite and nitrate], and g) a plurality of anammox organisms that provides nitrite oxidizing bacteria repression, wherein the system is configured to produce an effluent stream, wherein said effluent stream is produced such that anammox bacteria can be selectively retained.

14. The system of claim 13, wherein the controller generates instructions for increasing the concentration of dissolved oxygen if the ratio of the [concentration of ammonia] to [the sum of the concentrations of nitrite and nitrate] is greater than 1.

15. The system of claim 13, wherein the controller generates instructions for decreasing the concentration of dissolved oxygen if the ratio of the [concentration of ammonia] to [the sum of the concentrations of nitrite and nitrate] is less than 1.

16. The system of claim 13, wherein the controller generates instructions for maintaining the concentration of dissolved oxygen if the ratio of the [concentration of ammonia] to [the sum of the concentrations of nitrite and nitrate] is 1.

17. The system of claim 13, wherein the controller generates instructions for increasing or decreasing or maintaining the concentration of dissolved oxygen to maintain a ratio of [a sum of the concentrations of nitrite and nitrate] to a [concentration of ammonia] that is from about 1.18 to about 1.45.

18. The system of claim 17, wherein the controller generates instructions for increasing or decreasing or maintaining the concentration of dissolved oxygen to maintain the ratio of [the sum of the concentrations of nitrite and nitrate] to the [concentration of ammonia] that is equal to about 1.32.

19. The apparatus of claim 13, wherein the effluent stream contains approximately equal proportions of ammonia and nitrite on an as nitrogen basis, such that further nitrogen removal can be accomplished using anammox in a fully anoxic suspended or biofilm process.

20. A system for removing nitrogen from a reactor for biological nitrogen removal from wastewaters comprising: a) a reactor; b) an ammonia sensor that senses a concentration of ammonia in the reactor in real time and generates an ammonia concentration signal; c) a nitrite sensor that senses a concentration of nitrite in the reactor in real time and generates a nitrite concentration signal; d) a nitrate sensor that senses a concentration of nitrate in the reactor in real time and generates a nitrate concentration signal; e) a controller that receives the ammonia concentration signal, nitrite concentration signal and nitrate concentration signal and generates instructions for increasing, decreasing or maintaining a duration of aerobic and anoxic period within the reactor based on a ratio of the [concentration of ammonia] to [a sum of the concentrations of nitrite and nitrate]; f) a dissolved oxygen modulator that supplies the dissolved oxygen to the reactor to control the duration of aerobic and anoxic pericids, wherein the dissolved oxygen modulator is under the control of the controller and controls the duration of the aerobic and anoxic periods based on the ratio of the [concentration of ammonia] to [the sum of the concentrations of nitrite and nitrate], wherein the system is configured to provide nitrite oxidizing bacteria repression and the production of an effluent stream for post-anammox polishing; and g) a plurality of anammox organisms in a post-anammox polishing reactor.

21. The apparatus of claim 20, further comprising a supply of acetate or acetic acid or other organic substrate that is added to accomplish denitratation (nitrate reduction to nitrite) and subsequent anammox growth on the provided ammonia and denitratation-produced nitrite.

22. The system of claim 20, wherein the controller generates instructions for increasing the duration of the aerobic period and/or decreasing the duration of the anoxic period if the ratio of the [concentration of ammonia] to [the sum of the concentrations of nitrite and nitrate] is greater than 1.

23. The system of claim 20, wherein the controller generates instructions for decreasing the duration of the aerobic period and/or increasing the duration of the anoxic period if the ratio of the [concentration of ammonia] to [the sum of the concentrations of nitrite and nitrate] is less than 1.

24. The system of claim 20, wherein the controller generates instructions for maintaining the duration of the aerobic period and/or the duration of the anoxic period if the ratio of the [concentration of ammonia] to [the sum of the concentrations of nitrite and nitrate] is 1.

\* \* \* \* \*